Sept. 20, 1932.   W. A. BARRETT   1,878,364

PASTEURIZING APPARATUS

Filed May 31, 1930

INVENTOR.
W. A. Barrett
by Elwin M. Hulse
ATTORNEY.

Patented Sept. 20, 1932

1,878,364

UNITED STATES PATENT OFFICE

WALTER A. BARRETT, OF FORT WAYNE, INDIANA

PASTEURIZING APPARATUS

Application filed May 31, 1930. Serial No. 457,885.

The invention relates to apparatus for pasteurizing various products such as milk. In pasteurizing milk it is required to heat the liquid to a predetermined temperature such as 142° or 145° Fahrenheit and to hold it at that temperature for a predetermined period of time. When the desired temperature is reached it is important, when the heating medium is cut off, that the temperature does not continue to rise even for a brief interval.

The object of my invention is to provide a simple pasteurizing apparatus wherein novel means for rapidly heating the contents is provided and means is provided by which, when the circulation of the heating medium is stopped, the said medium is almost instantly removed from contact with the surface of the receptacle containing the product to be pasteurized, and the product is held at a predetermined temperature for a predetermined period of time.

The invention consists in a plurality of receptacles one within the other, the inner receptacle being adapted to receive the product to be pasteurized, means to supply a heating medium to the intermediate receptacle from which the medium overflows into the outer receptacle and returned by said means to the intermediate receptacle, the outer receptacle having a discharge that is effective when the heating medium reaches a predetermined level in the outer receptacle.

The invention is illustrated in the accompanying drawing in which

Figure 1:
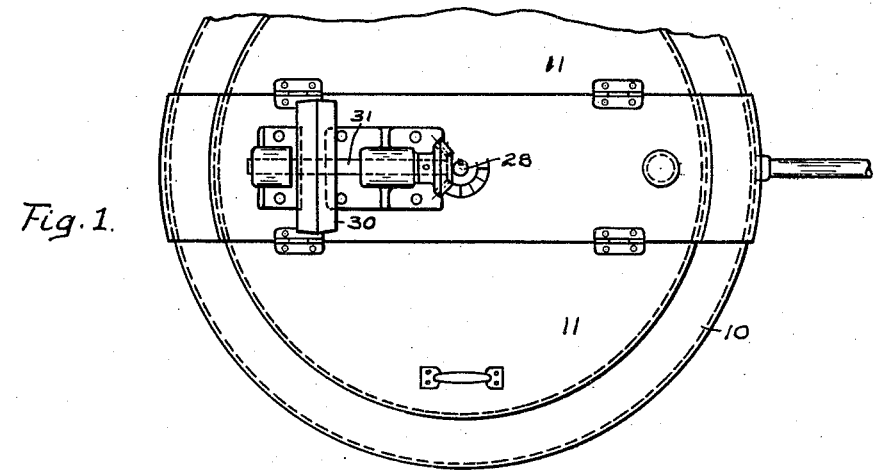
Figure 2:
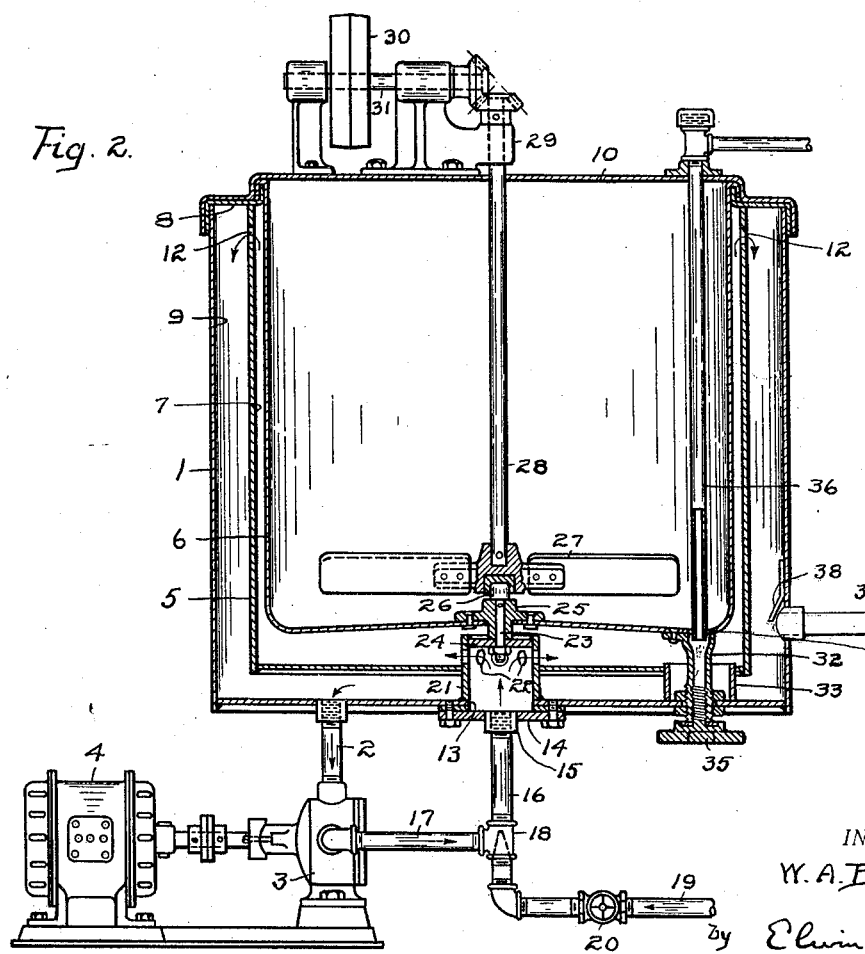

Figure 1 is a fractional plan view of the apparatus and Fig. 2 a central cross section of the same.

Referring to the illustrative embodiment of the invention, 1 represents a tank or receptacle with which a pipe 2 communicates. The pipe also communicates with a pump 3 driven in suitable manner, as by the electric motor 4 suitably supported. Within the tank or receptacle 1 is an intermediate tank or receptacle 5 and within the tank or receptacle 5 is the inner tank or receptacle 6 for the reception of the matter to be pasteurized, as milk. The space 7 between the side walls of the tanks 5 and 6 is such that the heating medium will rise in the space substantially in the form of a film. An angle plate 8 is rigidly engaged on the upper edges of the sides of the tanks 1 and 5 and the upper portion of the tank 6 is bent over the upper edge of the plate so as to cause the spaces 7 and 9 between the tanks to be substantially air tight. A cover 10 is engaged in the rim of the inner tank and portions 11 thereof are hinged to the remainder to afford access to the latter tank. Ports 12 are formed in the wall of the intermediate tank near the upper edge thereof.

An opening 13 in the bottom of the tank 1 is closed by a detachable plate 14 which carries a connection 15 engaged by a pipe 16 to which a pipe 17 is connected by a mixing T 18. The pipe 17 leads from the discharge side of the pump 3. A steam pipe 19 controlled by a valve 20 is connected to the T 18. A sleeve 21 is secured to the bottom of the tank 1 and about the opening 13, the pipe 16 having communication with the interior of the sleeve. This sleeve extends through an opening in the bottom of the tank 5 and is secured to said bottom, and apertures 22 are formed in the wall of the sleeve above the bottom of the tank 5. A bolt 23 extends through the plate 24 fixed in the top of the sleeve and through a casting 25 secured to the bottom of the tank 5. The head 26 of the bolt is shaped to form a bearing for the agitator 27 within the tank 6 and secured to a shaft 28. The shaft projects through the cover 10 and is supported in a bearing 29 mounted on the cover. Any suitable means for rotating the agitator may be used. As an illustration of one such means I show a pulley 30 mounted on a shaft 31 that is geared to the shaft 28, the pulley being driven by any suitable power mechanism.

A sleeve 32 extends through an opening in the bottom of the tank 1 and is secured in fluid tight manner to said wall by the nuts $32^a$ that are in threaded engagement with the sleeve. The sleeve 32 also extends through a sleeve 33 that is secured to the bottom of said tank and also extends through an opening in the bottom of the tank 5 and is secured to said bottom. The sleeve 32 at its upper end is secured to the bottom of the tank 6 and about an opening 34 therein, and its lower end is closed by a screw plug 35. A pipe 36 is extended through the cover 10 and into the opening 34 in the bottom of the tank 6. The bottom of the tank 6 slopes downward outwardly so that the contents of the tank will flow through the opening 34 into the sleeve 32 which opening is larger than the pipe 36. A suitable pump will be connected to the pipe 36 for withdrawing the contents of the tank 6.

A discharge or overflow pipe 37 is connected to the tank 1 at a point such that the heating medium in the space 9, when the device is shut down, will drain therefrom to a level below the bottom of the tank 6. A baffle 38 above the entrance to the discharge pipe 37 diverts the descending medium from entering the discharge pipe during the operation of the apparatus.

In operation the milk to be pasteurized is placed in the tank 6, water is inserted in the tank 1 to a level preferably above the bottom of tank 5, the pump 3 and the agitator are set into motion and steam is admitted through the conduit 19 to heat the water. The hot water circulates upwardly in a film between the tanks 5 and 6 and overflows through the ports 12 into the tank 1 and is drawn therefrom by the pump and returned to the tank 5. This circulation is rapid and positive and will facilitate or speed up the heat transfer to the contents of tank 6. The valve 20 permits a control of the steam supply to regulate the degree of heat. The hot water heats the tank 6 and its contents and the agitator assures a thorough heating of those contents. When the temperature has reached the predetermined degree, the pump and agitator are stopped, the water in the spaces 7 and 9 immediately seek a common level through the conduit connections 2, 17, 16, 21, the location of the level being established by the overflow conduit 37. Since the amount of water in space 7 is relatively small this water drops very rapidly into the lower part of the tank 5 and since the overflow 37 is below the bottom of the tank 6 the final level of the water in tank 5 will be below the tank 6 and the heating medium is thereby removed from contact with the tank 6. The spaces 7 and 9 between the walls of the tanks are now dead air spaces, so that they act as an insulation to maintain the milk at the predetermined degree for the prescribed time. At the expiration of the holding period the pasteurized milk is withdrawn through the pipe 36. Any suitable means for circulating the heating medium will suffice, the pump 3 being illustrative only.

What I claim is:

1. A pasteurizing apparatus comprising an inner receptacle for the product to be pasteurized, an outer receptacle, an intermediate receptacle spaced from each of the other receptacles, the space between the intermediate and inner receptacles being relatively narrow laterally and having communication at the upper portion thereof with the other space, means to supply a liquid heating medium to the intermediate receptacle and to cause said medium to circulate upwardly through the relatively narrow space and downwardly through the outer space and an overflow conduit having communication with the latter space at such point that when the circulation of the said medium is stopped the portion of the medium in both spaces rapidly drops to a level immediately below the bottom of the inner receptacle.

2. A pasteurizing apparatus comprising a plurality of receptacles one within another and means to circulate a liquid heating medium through two of the receptacles to heat the innermost receptacle and its contents to a predetermined temperature, and means communicating with the said outer and intermediate receptacles and adapted when the circulation is stopped to remove a predetermined portion of the medium whereby the remainder of the medium maintains the contents of the innermost receptacle at said predetermined temperature for a predetermined period of time.

3. A pasteurizing apparatus comprising a plurality of receptacles one within another and spaced from each other, the innermost receptacle being adapted to contain the product to be treated, means engaging the upper edge of each receptacle to close the spaces between the receptacles, the spaces having communication with each other in their upper portions, means to circulate a heating medium through said spaces to heat the contents of the inner receptacle and means extending downwardly into the inner receptacle for drawing out the contents of said receptacle.

4. A pasteurizing apparatus comprising a plurality of receptacles one within another and spaced from each other, the innermost receptacle being adapted to contain the product to be treated, means having communication with the outer and intermediate receptacles for circulating a heating medium in the spaces between the receptacles, a chamber having communication with the innermost receptacle at the bottom thereof and a member extending down through the latter receptacle and into the chamber for drawing out the contents of the said latter receptacle.

5. A pasteurizing apparatus comprising three receptacles one within another, the innermost receptacle being adapted to contain the product to be pasteurized and means to circulate a liquid heating medium through the other two receptacles, the circulating movement thereof being upward in the intermediate receptacle and downward in the outermost receptacle.

6. A pasteurizing apparatus comprising three receptacles one within another, the innermost receptacle being adapted to contain the product to be pasteurized and the other two receptacles being adapted to receive a circulating liquid heating medium, the movement of the medium being upwardly in the intermediate receptacle and downwardly in the outer receptacle and means communicating with the latter receptacles to cause the medium to fall to a point below the innermost receptacle when the circulation thereof is stopped.

7. A pasteurizing apparatus comprising three receptacles one within another, the innermost receptacle being adapted to contain the product to be pasteurized and the other two receptacles being adapted to receive a circulating liquid heating medium the movement of the medium being upwardly through the intermediate receptacle and in contact with the outer surface of the innermost receptacle and downwardly through the outermost receptacle and means having communication with the lower portions of the outer and intermediate receptacles to cause the level of the said medium to fall in said latter receptacles to a point below the bottom of the innermost receptacle when the circulation of the medium is stopped.

8. A pasteurizing apparatus comprising three receptacles one within another, the side wall of the intermediate receptacle being relatively close to the side wall of the innermost receptacle, the innermost receptacle being adapted to contain the product to be pasteurized, and the other two receptacles being adapted to contain a circulating liquid heating medium the movement of which medium is upwardly in the intermediate receptacle and downwardly in the outermost receptacle and means having communication with the intermediate and outermost receptacles to cause the liquid heating medium in the latter receptacles to fall to a common level below the bottom of the innermost receptacle when the circulation is stopped.

9. A pasteurizing apparatus comprising three receptacles one within another, the innermost receptacle being adapted to contain the product to be pasteurized, means to circulate a liquid heating medium upwardly in the intermediate receptatcle and downwardly in the outer receptacle, an overflow member communicating with the outer receptacle and means communicating with both the outer and intermediate receptacles and adapted when the circulation is stopped to cause the medium in said latter receptacles to drop to the level established by the overflow conduit.

10. A pasteurizing apparatus comprising three receptacle constituting an inner receptacle, an intermediate receptacle having one wall in common with the inner receptacle, an outer receptacle having one wall in common with the intermediate receptacle, said inner receptacle being adapted to contain the substance to be pasteurized, means to circulate a heating medium through the intermediate and outer receptacles with the circulating movement of the medium being upward in the intermediate receptacle and downward in the outer receptacle, and means to draw off the heating medium from the space between the side walls of the inner and intermediate receptacles to bring the medium slightly below the bottom of the inner receptacle.

11. A pasteurizing apparatus comprising three receptacles constituting an inner receptacle, an intermediate receptacle having one wall in common with the inner receptacle, an outer receptacle having one wall in common with the intermediate receptacle, said inner receptacle being adapted to contain the substance to be pasteurized, and means to circulate a heating medium through the intermediate and outer receptacles with the circulating movement of the medium being upward in the intermediate receptacle and downward in the outer receptacle, said last means including pipes affording communication between the bottom portions of the outer and intermediate receptacles and provided with a fluid distributing perforated header in the intermediate receptacle below the bottom of the inner receptacle, and means to drain the space between the inner and intermediate receptacles through the header to a level slightly below the inner receptacle.

12. A pasteurizing apparatus comprising three receptacles constituting an inner receptacle, an intermediate receptacle having one wall in common with the inner receptacle, an outer receptacle having one wall in common with the intermediate receptacle, said inner receptacle being adapted to contain the substance to be pasteurized, means to circulate a heating medium through the intermediate and outer receptacles with the circulating movement of the medium being upward in the intermediate receptacle and downward in the outer receptacle, said last means including pipes affording communication between the bottom portions of the outer and intermediate receptacles and provided with a fluid distributing perforated header in the intermediate receptacle below the bottom of the inner receptacle, an overflow member communicating with the outer receptacle, and means to drain the space between the inner and intermediate receptacles through the header to a level slightly below the inner receptacle.

In witness whereof I have hereunto subscribed my name.

WALTER A. BARRETT.